United States Patent Office 2,970,103
Patented Jan. 31, 1961

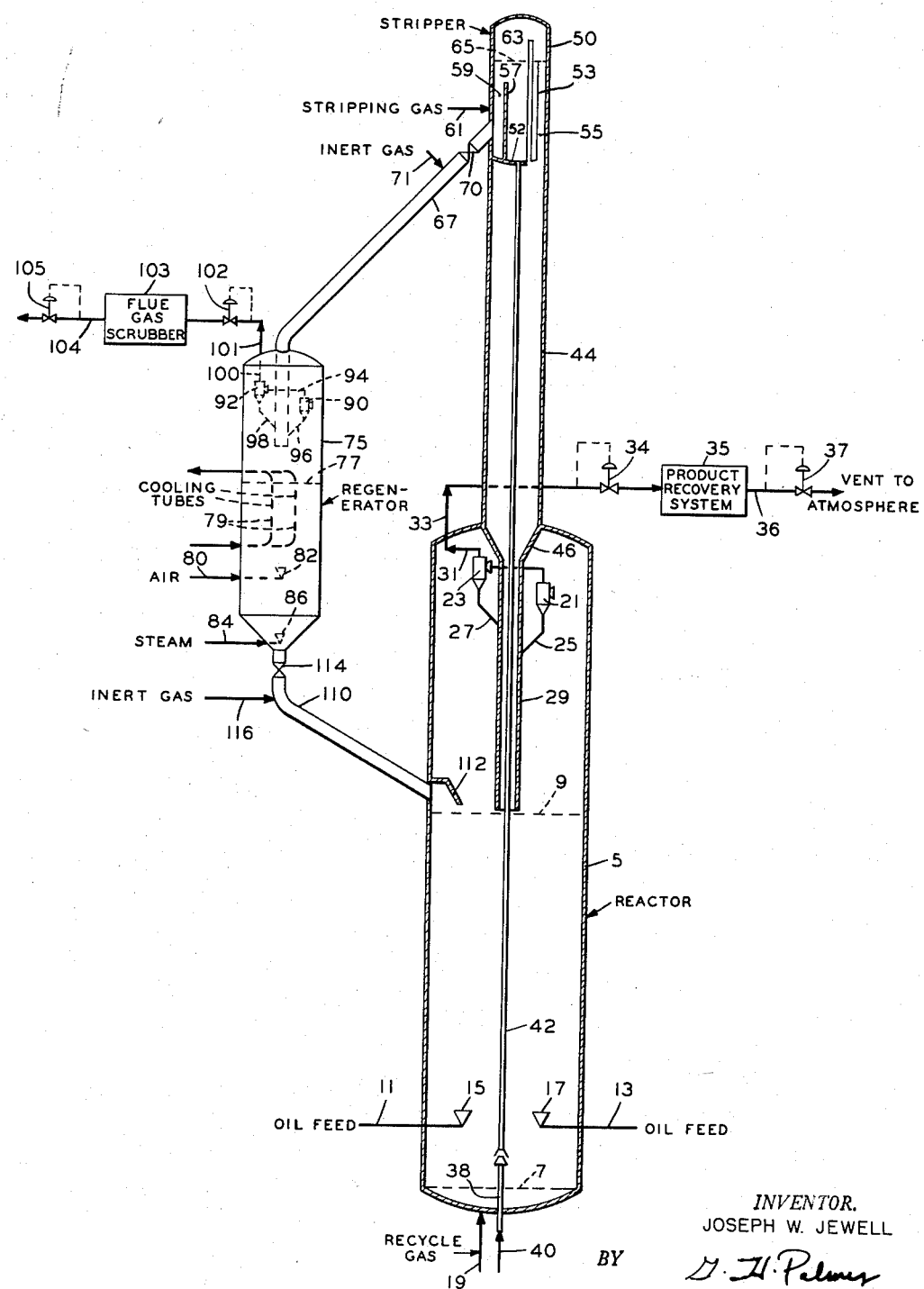

2,970,103

MINIMIZING PRESSURE SURGES IN A FLUIDIZED HYDROCARBON CONVERSION PROCESS

Joseph W. Jewell, Summit, N.J., assignor to The M. W. Kellogg Company, Jersey City, N.J., a corporation of Delaware Original application July 1, 1953, Ser. No. 365,435, now Patent No. 2,891,907, dated June 23, 1959. Divided and this application Sept. 22, 1958, Ser. No. 762,370

5 Claims. (Cl. 208—164)

This invention relates to an improved fluid system, and more particularly, it pertains to method and means for improvements in a fluid operation wherein catalyst flows from one processing zone to another whereby the adverse effects of pressure surges are significantly minimized.

This application is a division of my prior and co-pending application Serial No. 365,435, filed July 1, 1953, now Patent No. 2,891,907.

In certain designs of fluid reaction systems, catalyst is circulated from one processing zone to another as a dense fluidized mass at a relatively low rate, consequently, the regeneration and transfer line, particularly the latter, does not contain a sufficient amount of catalyst to absorb any appreciable quantity of heat. The process may operate at a superatmospheric pressure, for example, about 250 p.s.i.g., and with a reversal of pressure, a backflow of gaseous material can take place. The backflow can result in overheating the transfer line to the point of failure by the commingling of oxygen containing gas from the regenerator with hydrocarbon and/or hydrogen flowing with the catalyst from the other processing vessel. The effect is only relatively less serious should the reactant materials backflow from the reactor through the regenerated catalyst transfer line and into the regenerator as resultant local overheating may damage the catalyst. In the transfer lines from the stripper to the regenerator to the reactor, the masses of catalyst are flowing downwardly. Since the catalyst flows as a dense fluidized mass in the transfer lines, there is a strong possibility of catalyst bridging due to the compressive effect of a pressure surge on the already dense phase in the lines. When catalyst bridges in a transfer line, the required pressure differential across the control valve in the line is lost, hence, gaseous material backflows from the processing vessel to which the catalyst normally feeds. In the case of regeneration gas backflowing into the spent catalyst transfer line, the oxygen in the gas will react with the hydrogen and/or hydrocarbons present in the line and cause excessive temperature rises by reason that there is little or no effective means of diluting or dissipating the heat generated. This can readily cause the transfer line to melt, and further, the fire once started may spread rapidly to the other processing vessels. It is apparent, therefore, that in designs or processes where the vessels are arranged to provide downflowing dense fluidized masses of catalyst, there is a need for an operation which eliminates or substantially overcomes the disadvantages inherent in such schemes.

An object of this invention is to provide improvements in fluid systems in which catalyst flows from one processing vessel to another, particularly in cases where the quantity of catalyst circulating through the regeneration system is relatively small.

Another object of this invention is to provide improved method and means for a fluid system where catalyst must be transferred between processing vessels and the danger of backflow is significantly minimized.

Still another object of this invention is to provide improved method and means for fluid hydroforming of naphtha fractions.

Other objects and advantages of this invention will become apparent from the following description and explanation thereof.

In accordance with the present invention, the danger of backflow which is hazard in a downflowing dense aerated mass of finely divided contact material passing from one processing zone to another in a fluid system is significantly minimized by passing or injecting an inert or aeration gas into said downflowing mass of material in a quantity sufficeint to reduce the flowing density such that the danger from backflow is significantly minimized. The quantity of gas introduced for the purpose of this invention is substantially more than is used for aeration as such, because in the latter case, the object is to add only enough gas so as to prevent density increases in the flowing mass of contact material.

In the practice of this invention, the inert gas supply is introduced at a pressure which is greater than the pressure existing in the transfer zone in order that the gas can also serve to buffer the effect of a back surge. If a back surge occurs in the transfer zone, the incoming gas will increase the pressure in the transfer zone near the injection point of the inert gas, and so offset the effect of the back surge. This effect is produced by maintaining the rate of aeration gas constant. The mechanism by which the aeration gas serves to offset the effect of back surging suggests injecting this inert gas at a point in the downflowing dense mass which is uppermost relative to the discharge end of the transfer zone. For example, in a transfer line connecting an elevated stripping zone with a lower positioned regeneration zone, a slide valve would be installed for the purpose of flow control as close to the beginning of the transfer line or as near to the stripping zone as possible, and the carrying or inert gas would be injected as close to the downstream side of the slide valve as is practical. Since the quantity of gas injected into the transfer zone is relatively large as compared to simple aeration, in the event of a backflow of undesired gaseous material into the transfer zone, this aeration or inert gas serves also as a diluting medium to minimize the effect of burning and/or explosion. In the event of combustion by reason of backflow, the inert gas serves as a heat diluent in suppressing undue temperature rises. Further, this inert gas serves to create a buffer or atmosphere of inert gas against which the backflowing gaseous material would have to flow to reach the higher processing zone, because the backflow material must be motivated by a force or pressure which is greater than the pressure under which the inert gas exists at the supply source.

In the determination of the quantity of inert or aeration gas to be used, the criterion to follow is to seek the amount of gas which will dilute the solid material to a density such as to overcome the tendency of the material to bridge when the pressure fluctuates by about 1 to 20 p.s.i.g., more usually, about 2 to 5 p.s.i.g, in each or both of the processing zones, which are interconnected by means of the particular transfer zone. Usually, it is found that the quantity of inert gas is sufficient to reduce the density of the downflowing, dense fluidized mass to about 20 to 50%, preferably about 20 to 35%, of the value at which it exists just prior to dilution with inert gas. The inert or aeration gas should be one which does not react with any of the materials being used in the processing zones. In the case of hydrocarbon conversion processes, steam serves very well for this purpose. Other gases which can be used are, for example, nitrogen, carbon dioxide, flue gas from the combustion of carbonaceous material in the same process, etc.

The technique of this invention can be applied to any process in which gaseous materials are contacted with finely divided solid material in separate processing zones; and the gaseous materials in the respective processing zones should remain separated from each other for any reason. The contact material is passed from one processing zone to another as a downflowing dense fluidized mass, thus providing the type of situation for which the present invention has particular applicability. In general, the contact material has a particle size of about 0 to 1000 microns, more usually, about 0 to about 100 microns, and this material can be a catalyst, adsorptive or absorptive solids, heating medium, cooling medium, etc. The processes for which this invention has special utility are the conversion of hydrocarbons such as, for example, catalytic cracking, hydroforming, cracking under hydrogen pressure, desulfurization, hydrogenation, dehydrogenation, etc. As previously mentioned, certain designs for fluid hydroforming are particularly suited for adaptation to this invention.

Further description of this invention will be made with reference to fluid hydroforming, however, this is done for the purpose of illustration, and so no undue limitations or restrictions are to be imposed by reason thereof on the scope of this invention.

This invention can be applied as an improvement to a fluid hydroforming system in which the processing vessels are arranged to provide for the transfer of catalyst from one zone to another as a downflowing dense fluidized mass. An example of a fluid hydroforming system for which the present invention can be used as an improvement involves transporting spent catalyst from the bottom of the reaction zone as a suspension to a superimposed stripping zone. After stripping, the catalyst is passed as a downflowing dense fluidized mass to a regeneration zone, and thence, the regenerated catalyst is passed as a downflowing dense fluidized mass to the lower portion of the reactor catalyst bed. In any case, it is noted that the transfer zones contain downflowing dense fluidized masses of catalyst. In these fluid systems, the angle of flow of solid material can vary over the range of being just greater than 45° relative to a horizontal plane or datum, and it can be vertical or 90° relative to the same base level. More usually, such transfer lines or zones are designed to be inclined at least about 60° from a horizontal plane, and preferably at least about 75° from the same plane in order to avoid the finely divided material settling in the transfer zone. The increased angle of flow from the horizontal can aid materially in maintaining a uniform flowing condition for the finely divided material, and this fact is exploited in the commercial design of transfer lines. By means of this invention, lower angles of flow, e.g., an angle just greater than zero or at least 30° from a horizontal level, can be used. At angles of less than 45° for this invention, it is preferred to use linear flow rates of about 10 to 25 feet per second.

The downflowing mass of dense aerated finely divided material can be diluted by means of the present invention to provide a lean phase of material in the transfer line. The point of demarcation between dense and lean phases is not easily defined, however, for the purpose of this invention, these phases can be defined in terms of the percentage of bulk or settled density they represent. Generally, the desirable lean phase is not more than about 5 to about 35% of the settled density, and the dense phase has a density above this figure. There is a range of densities which might be considered as intermediate between dense or lean phase, however, for the purpose of this invention, these densities will be included within the range of lean phase densities. It should be noted that in the present invention, the density of the downflowing mass of finely divided solids in the transfer line is not necessarily regulated to provide a standpipe of fluidized material which exerts a fluistatic pressure for the purpose of pressure balance in the system. In one aspect of this invention, the density of the downflowing mass can be small enough to create no fluistatic pressure in the sense of a standpipe for the purpose of this invention.

In a hydroforming process, the catalyst is one which has the properties of forming aromatics or it is an aromatizing catalyst which is capable of dehydrogenating naphthenes, isomerizing and cracking acyclic and cyclic hydrocarbons, and dehydrocyclizing acyclic hydrocarbons. Catalysts found useful for this purpose include the sulfides and/or oxides of the left hand elements of group VI, the oxides and/or sulfides of the group V metals, the noble metals of group VIII, etc. Specific examples of catalytic elements having the properties mentioned above are molybdenum trioxide, tungsten oxide, chromia, platinum, palladium, vanadium oxide, etc. These catalytic elements are used alone or they are supported on a suitable carrier material such as, for example, alumina, zinc spinel, silica, magnesia, titania, zirconia, silica-alumina, bauxite, charcoal, alumina-thoria, etc. Another class of catalytic elements which are specially effective for the hydroforming reaction are the heteropoly acids such as, for example, phosphomolybdic acid, silicomolybdic acid, germanomolybdic acid, chromiomolybdic acid, etc. These catalytic elements may be used alone or they can be supported on the carrier materials mentioned above. In general, the catalytic element constitutes about 0.1 to about 50% by weight, more usually, about 0.5 to about 20% by weight based on the total catalyst.

The feed stock to be reformed by means of the present invention is a light hydrocarbon oil and includes, for example, gasoline, naphtha and kerosene. The light hydrocarbon oil can have an initial boiling point of about 85° to about 325° F. and an end point of about 300° to about 500° F. In the case of reforming a naphtha fraction, it is preferred to employ a naphtha having an initial boiling point of about 100° to about 250° F. and an end point of about 350° to about 450° F. Generally, the light hydrocarbon oil to be reformed has a Watson characterization factor of about 11.50 to about 12.20. The feed material can be one which is a straight run or virgin stock, a cracked stock which is derived from a thermal or catalytic cracking operation, or a mixture or a blend of straight run and cracked stocks. Accordingly, the octane number of the feed material can be at least 5 CFRR clear, or more usually, about 20 to about 70 CFRR clear and the olefin content of the oil can vary from about 0 to about 30 mol percent. This light hydrocarbon oil can be derived from any type of crude oil, consequently, it can contain sulfur in the amount of 0 to about 3.0% by weight.

The light hydrocarbon oil is reformed under conditions which can involve the net consumption or net production of hydrogen. A system involving the net production of hydrogen is referred to hereunder as hydroforming, and it is operated under such conditions that the quantity of hydrogen produced is sufficient to sustain the process without the need for extraneous hydrogen. Generally, for the reforming of light hydrocarbon oils, a temperature of about 750° to about 1100° F. is employed. At this temperature, the pressure of the operation is generally maintained at about 25 to about 1000 p.s.i.g. The quantity of oil processed relative to the amount of catalyst employed is measured in terms of weight space velocity, that is, the pounds of oil feed on an hourly basis charged to the reaction zone per pound of catalyst which is present therein. The weight space velocity can vary from about 0.05 to about 10. The concentration of hydrogen to be maintained in the reactor feed is usually measured in terms of the standard cubic feet of hydrogen (measured at 60° F. and 760 mm.) per barrel of oil feed charged (1 barrel=42 gallons). On this basis, the hydrogen rate is about 500 to about 20,000 s.c.f.b. Another method of indicating the quantity of hydrogen which can be present during the reforming operation is by means of hydrogen partial pressure. In this regard, the hydrogen partial pressure is about 15 to about 950 p.s.i.a. in the reaction zone, based on inlet conditions.

In a hydroforming operation, the reaction conditions fall within the ranges specified hereinabove, however, they are selected on the basis of obtaining a net production of hydrogen. A preferred hydroforming process involves a temperature of about 850° to about 1050° F.; a pressure of about 50 to about 500 p.s.i.g.; a weight space velocity of about 0.1 to about 3; a hydrogen rate in the reactor feed of about 1000 to about 7500 s.c.f.b. and a hydrogen partial pressure of at least about 25 p.s.i.a., and up to the point at which hydrogen is consumed.

The regeneration treatment for the removal of carbonaceous material from the contact material is conducted at a temperature of about 800° to about 1200° F. and preferably, at a temperature of about 950° to about 1150° F. This treatment is effected with an oxygen containing gas, e.g., oxygen, air, diluted air having about 1 to about 10% by volume of oxygen, etc. These conditions can be used for either partial or complete regeneration and, as previously mentioned, the temperature can be higher or lower for one treatment over the other, depending upon the reaction desired.

In the accompanying drawing, improved method and means for the operation of fluid hydroforming are illustrated. For a better understanding of the present invention, these improvements will be discussed below.

In the drawing, reactor 5 is a vertical, cylindrical vessel having a grid plate 7 in the bottom part thereof upon which there is situated a fluidized mass of finely divided catalyst comprised of 9% $MoO_3$ supported on alumina shown as having a level 9. Split streams of naphtha vapor are introduced by means of lines 11 and 13 and conical distributors 15 and 17, respectively, into the bottom part of the reactor, such that each stream is discharged into one-half of the cross-sectional area of the reaction zone. The total naphtha feed is introduced at the rate of 2000 barrels per stream day and at a temperature of about 930° F. and by virtue of the quantity of catalyst which is present in the reaction zone, there is provided a weight space velocity of about 0.45. The temperature in the reaction zone is maintained at about 930° F. under a total pressure of about 250 p.s.i.g. Recycle gas containing approximately 60% by volume of hydrogen is fed into the bottom end of the reactor by means of line 19 at the rate of 5000 s.c.f.b. The recycle gas is fed below the grid plate 7 in the reactor in order that the grid plate may serve to distribute the gas uniformly over the cross-sectional area of the reaction zone. This recycle gas is introduced at a temperature of about 1250° F. and it serves to supply a substantial amount of the endothermic heat of reaction which is required for the hydroforming process. The reaction product becomes disengaged from the catalyst bed, and it usually carries a small amount of catalyst fines. The product material leaves the reactor by first passing through a cyclone separator 21 which is in series with a second cyclone 23. The separated catalyst fines are returned to the reaction zone by first passing through diplegs 25 and 27 of cyclones 21 and 23, respectively, which diplegs are in turn connected to vertical, downflow conduit 29 through which excess catalyst and the gas used to lift the catalyst in riser 42 flow from the stripper hopper downwardly to the reactor bed. The reaction product substantially free of catalyst fines first passes through vertical line 31 of cyclone 23 and then it is discharged from the system by means of line 33. In the reactor product discharge line 33, there is installed a control valve 34 for the purpose of maintaining the desired reaction pressure in the reactor 5. It should be understood that from the standpoint of optimum pressure control in the system, it is preferred to have a low pressure drop control valve, such as valve 34, positioned in discharge line 33 ahead of any other equipment and close to the reactor. The dissipation of pressure from essentially operating level to a substantially lower level, such as atmospheric pressure, may be effected at a remote point from the position of the low pressure drop control valve, such that the latter control valve serves to dampen any variations in pressure in the system which may tend to adversely influence the reactor pressure, hence, the result is that the reactor undergoes less pressure fluctuation than is experienced normally without the low pressure drop control valve. This additional provision for close control permits the use of lower pressure drops across catalyst transfer line control valves with less danger of backflow. In the drawing, the arrangement is illustrated by means of a product recovery system shown schematically as 35, and downstream of the product recovery system, the net production of normally gaseous product from the recovery system flows through line 36 prior to being vented to the atmosphere through high pressure drop control valve 37. By controlling the pressure of the reactor in this fashion, there is less of a pressure fluctuation therein by reason that valve 34 will act quickly to restore the desired pressure level without the time lag normally associated with a control system in which a single control valve is employed for dissipating operating pressure to the atmosphere. Therefore, in systems using a single control means, it operates at a much higher pressure drop and is more susceptible to appreciable pressure fluctuation. Therefore, by means of this installation, control valve 34 functions with a minimum of pressure drop in its operation, for example, about 1 to 5 p.s.i.g. This feature is highly important, because downflowing dense fluidized masses of catalysts in transfer zones are subjected to smaller pressure variations and of less time duration by reason of the close control on fluctuations of pressure in the reactor. Hence, there is less of a tendency for the catalyst in the transfer lines to become deaerated due to large pressure fluctuations in the processing vessels.

Spent catalyst is withdrawn from the bottom part of the reactor, below the entrance point of the naphtha feed and above the point of entrance of the recycle gas. The rate of withdrawal of spent catalyst is controlled by means of a plug valve 38 to which there is fed through the hollow stem any suitable carrying gas, such as steam, by means of a supply line 40. Spent catalyst flowing through plug valve 38 is picked up by the carrying gas, and it is transported upwardly as a suspension through a vertical riser 42. There is superimposed on reactor 5 a catalyst hopper 44, which is a vertical, cylindrical vessel. While this vessel 44 is termed a hopper, it should be understood that for the purpose of this specification and the appended claims, that this vessel does not necessarily retain a bed of catalyst, but it serves primarily as a conduit for the downward flow of gases and solids. Hopper 44 is connected to vertical downcomer 29 by means of a reduced section 46. A vertical, cylindrical stripper 50 superimposes the catalyst hopper 44. This stripper 50 contains a partition 52 which separates it from the hopper 44. In one side of the stripper there is situated a vertical, transverse baffle 53 which forms a duct 55 by means of which excess spent catalyst lifted to the stripper hopper is returned to the catalyst hopper 44. Generally, about 1 to about 40% by weight of the total catalyst passed upwardly in riser 42 is recycled to the reactor by means of hopper 44. Preferably, about 5 to 15% by weight, on the same basis, is recycled. In an opposite position to duct 55 a second transverse baffle 57 of shorter length than transverse baffle 53 is situated and this forms a stripping well 59. Stripping gas is fed into the bottom part of stripping well 59 by means of line 61. A vertical conduit 63 is connected to partition 52 in the bottom of the stripper and it is in open communication with hopper 44. The upper end of this conduit 63 is situated in the vapor space in the stripper above the catalyst bed level 65. Any gaseous material is discharged therefrom through conduit 63 and/or through duct 55. By the design of the stripper, a level of catalyst is always maintained therein by providing recycle of spent catalyst through duct 55. Further, the transverse baffle 53 which forms duct 55 is of greater length than transverse baffle 57 which forms stripping well 59. In this manner, there is a positive and substantially uniform head of catalyst above the stripper well providing a reserve capacity of catalyst hold-up in a section of greater cross-sectional area, thus avoiding, to a great extent, the possibility of losing the catalyst level in the stripper in case of normal changes in the flow of catalyst to the regenerator, which in turn would cause a change in the available pressure over the slide valve. Vertical riser 42, which was previously mentioned, is the conduct by which spent catalyst is transported as a suspension from the reactor and has its upper end connected to partition 52 which forms the bottom of stripper hopper 50. Hence, spent catalyst is withdrawn from the reactor at a greater rate than is necessary for regeneration and restoration of catalytic activity. The recycle of spent catalyst also serves to increase the internal circulation of catalyst particles within the reactor bed, thus resulting in a more uniform distribution of catalyst particles of different activity and a consequent improvement in reactor efficiency. The stripped catalyst is discharged from stripping well 59 by means of a spent catalyst transfer line 67. Catalyst is discharged from the stripping well, which is sufficient to provide a catalyst to oil ratio of about 0.4. On the other hand, the rate of spent catalyst recycled to the reaction zone constituted about 10% by weight of the total catalyst passed upwardly in riser 42. In operation, spent catalyst recycle is combined with the stripped gaseous product material flowing downwardly through duct 55, and thence, as a combined stream they flow downwardly through hopper 44, downcomer 29 and then discharge just above catalyst level 9 in the reactor. The pressure in the stripper is maintained at 250 p.s.i.g. and at a temperature of 900° F. About 300 pounds per hour of steam is fed into the stripping well 59 through line 61.

The stripped spent catalyst is withdrawn from the stripping well 59 as a dense fluidized mass having a density of about 35 pounds per cubic foot. The rate of catalyst withdrawal is controlled by means of a slide valve 70 which is installed in the upper part of carrier line 67 in close proximity to stripper well 59. Downstream of slide valve 70, any suitable inert gas, such as steam, is fed into carrier line 67 by means of line 71 at a rate sufficient to reduce the flowing density of the spent catalyst to about 10 pounds per cubic foot. The rate of inert gas being supplied to the downflowing spent catalyst mass is held constant at this figure, and it is supplied from a source which is maintained at a pressure sufficiently higher than the system pressure to assure constant flow against normal fluctuation in the system pressure and to provide a positive means of quickly blowing out any plug in the transfer line. Carrier line 67 is joined with a regenerator 75. This carrier line projects a considerable distance within the regenerator proper above the bed level. The regenerator contains a dense fluid bed of catalyst having a level 77. The heat of regeneration is removed by means of cooling tubes 79. Regeneration gas, air, is fed through a supply line 80 and a conical distributor 82 into the lower part of the catalyst bed in the regenerator. The air is introduced at a point which is about 10 feet above the bottom of the regenerator vessel. At the bottom of the regenerator there is introduced steam by means of line 84 and conical distributor 86. The steam serves to strip from the regenerated catalyst any oxygen which might be occluded therewith. That portion of the catalyst bed which is situated between the steam inlet 84 and the air inlet 80 is a stripping zone for the regenerated catalyst. By stripping the regenerated catalyst in this manner, there is provided a reserve of catalyst of low oxygen concentration such that any pressure fluctuation causing increased flow to the reactor does not introduce appreciable quantities of oxygen to the reactor. The temperature in the regenerator is maintained at 1100° F. and at a pressure in the top of the vessel of 250 p.s.i.g. It is to be noted that the system being described has equal pressures in the regenerator, reactor and stripper. Such a scheme eliminates the need for a catalyst density in the catalyst transfer line which will act as a fluistatic head to produce a higher pressure at the outlet than at the inlet of such lines. And by this arrangement the factors influencing the flow of catalyst in the transfer lines from one side to the other of the system, are not in any way affected by varying bed levels in either the reactor or the regenerator. The flue gas is disengaged from the catalyst bed, and it contains a small amount of entrained catalyst fines which is recovered to a substantial extent by means of cyclones 90 and 92 which are connected in series. The flue gas first passes through cyclone 90 and the gaseous material discharged from the first cyclone is passed to cyclone 92 by means of line 94. The separated catalyst is returned from the cyclones 90 and 92 by means of diplegs 96 and 98, respectively, to the lower end of carrier line 67 which depends from the top of the regenerator. The flue gas, substantially free of catalyst fines, is discharged from cyclone 92 by means of a line 100, and the gaseous material leaves the regenerator system through a vent line 101.

There is installed in vent line 101, a control valve 102 which serves to maintain the desired pressure in the regenerator. As in the case of the reaction system, control valve 102 operates with a rather small pressure differential, hence, there is little time lag between the fluctuaton of the pressure and the time when the control valve responds or functions. The advantage in this type of contiol has been explained in connection with the reaction system. The flue gas then flows to a scrubber shown schematically as 103, from which it flows into a line 104. Line 104 contains a control valve 105 which serves to dissipate pressure from an operating level to atmospheric pressure. As previously indicated, the pressure existing at the top of the regenerator is maintained at approximately 250 p.s.i.g. which is the same as the reactor pressure. In this manner, should there be a fluctuation in catalyst circulation which would cause a backflow of gaseous materials from one zero to the other, the backflow receives essentially no help from the pressure in either of the processing zones, because there is no pressure differential between them. The stripped regenerated catalyst is withdrawn through carrier line 110, which is connected to the bottom end of the regenerator 75, and in turn, it is conveyed to the reactor 5 at a point above the level 9 of the catalyst bed situated therein. At the point where regenerated catalyst is discharged from the reactor, there is situated a baffle 112 for the purpose of preventing undue scattering of catalyst throughout the reactor above the catalyst level 9. Near the bottom of the regenerator, there is installed a valve 114 in carrier line 110 for the purpose of controlling automatically the rate of catalyst withdrawal. At a short distance from the downstream side of valve 114, inert gas, such as steam, is introduced through line 116. The regenerated catalyst is withdrawn from the regenerator having a density of about 35 pounds per cubic foot and by means of dilution of steam in carrier line 110, this density is reduced to about 10 pounds per cubic foot.

From the description above, the improved system contains many advantages over other existing designs for the same application. By means of the arrangement shown in the drawings, the spent catalyst is transported to an elevated position or stripper 50, such that a constant catalyst level is maintained therein by having baffle 53 of greater height than baffle 57, and the relative heights of the equipment are such that there can be continuous downflow in lean phase in the transfer lines from the spent catalyst stripper to the regenerator and back to the reactor, with no influence of the bed levels on the characteristics of flow in these lines, and with no appreciable influence of conditions in the transfer lines on the control pressure drop across the slide valves. The pressure balance of the system permits the installation of control valves in the top of the transfer lines rather than the bottom part of the lines, thus the system can operate without standpipes. The dilution of downflowing catalyst in the transfer lines provides flowing velocities of about 3 to 20 feet per second, preferably, about 5 to 10 feet per second, consequently, there is less danger of plugging and the velocities can be low enough to substantially avoid an erosion problem. The stripping zone in the bottom of the regenerator provides a mass of catalyst which can absorb heat in the case of combustion from backflow of reactant materials from the reactor. This is also true of the stripper by reason of the catalyst hold-up therein.

Having thus provided a description of my invention, it should be understood that no undue limitations or restrictions are to be imposed by reason thereof, but that the scope of this invention is defined by the appended claims.

I claim:

1. A process which comprises contacting a hydrocarbon reactant in the presence of hydrogen with a mass of finely divided contact material in a reaction zone to produce a vaporous reaction product, withdrawing a portion of said reaction product from said reaction zone, passing the product thus withdrawn through a first transfer zone into a product recovery system, variably constricting said first transfer zone at a point between said reaction zone and said product recovery system to impose a pressure drop upon the system, withdrawing products from said recovery system through a second transfer zone, and variably constricting said second transfer zone at a point between said product recovery system and the point of product withdrawal from said second transfer zone to impose a pressure drop upon the system greater than that imposed by the constriction of said first transfer zone and whereby the adverse effect of pressure surges is significantly minimized.

2. A process which comprises contacting a hydrocarbon reactant in the presence of hydrogen with a dense bed of finely divided solid contact material in a reaction zone to produce a vaporous reaction product, withdrawing a portion of said reaction product from said reaction zone, passing the product thus withdrawn through a first transfer zone into a product recovery system, variably constricting said first transfer zone at a point between said reaction zone and said product recovery system to impose a pressure drop upon the system, withdrawing products from said recovery system through a second transfer zone, and variably constricting said second transfer zone at a point between said product recovery system and the point of product withdrawal from said second transfer zone to impose a pressure drop upon the system greater than that imposed by the constriction of said first transfer zone and whereby the adverse effect of pressure surges is significantly minimized.

3. A process which comprises contacting a hydrocarbon reactant in the presence of hydrogen with a dense bed of finely divided solid contact material in a reaction zone at superatmospheric pressure to produce a vaporous reaction product, withdrawing a portion of said reaction product from said reaction zone, passing the product thus withdrawn through a first transfer zone into a product recovery system, variably constricting said first transfer zone at a point between said reaction zone and said product recovery system to impose a pressure drop upon the system, withdrawing products from said recovery system through a second transfer zone, and variably constricting said second transfer zone at a point between said product recovery system and the point of product withdrawal from said second transfer zone to impose a pressure drop upon the system greater than that imposed by the constriction of said first transfer zone and whereby the adverse effect of pressure surges is significantly minimized.

4. A hydrocarbon conversion process which comprises contacting a hydrocarbon reactant in the presence of hydrogen with a dense bed of finely divided solid contact material in a reaction zone to produce a vaporous reaction product, withdrawing a portion of said reaction product from said reaction zone, passing the product thus withdrawn through a first transfer zone into a product recovery system, variably constricting said first transfer zone at a point between said reaction zone and said product recovery system to impose a pressure drop upon the system, withdrawing products from said recovery system through a second transfer zone, and variably constricting said second transfer zone at a point between said product recovery system and the point of product withdrawal from said second transfer zone to impose a pressure drop upon the system greater than that imposed by the constriction of said first transfer zone and whereby the adverse effect of pressure surges is significantly minimized.

5. A hydrocarbon conversion process which comprises contacting a hydrocarbon reactant in the presence of hydrogen with a dense bed of finely divided solid contact material in a reaction zone at superatmospheric pressure to produce a vaporous reaction product, withdrawing a portion of said product from said reaction zone, passing the product thus withdrawn through a first transfer zone into a product recovery system, variably constricting said first transfer zone at a point between said reaction zone and said product recovery system to impose a pressure drop upon the system, withdrawing products from said recovery system through a second transfer zone, and variably constricting said second transfer zone at a point between said product recovery system and the point of product withdrawal from said second transfer zone to impose a pressure drop upon the system greater than that imposed by the constriction of said first transfer zone and whereby the effect of pressure surges is significantly minimized.

References Cited in the file of this patent

UNITED STATES PATENTS

| | | |
|---|---|---|
| 2,460,356 | Liedholm | July 10, 1951 |
| 2,598,058 | Hunter | May 27, 1952 |
| 2,689,823 | Hardy et al. | Sept. 21, 1954 |
| 2,797,189 | Virgil | June 25, 1957 |